United States Patent
Gao et al.

(10) Patent No.: US 11,212,031 B2
(45) Date of Patent: Dec. 28, 2021

(54) METHODS AND APPARATUS FOR COMMUNICATION OF A DCI

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

(*) Notice: Subject to any disclaimer, the term of this patent is extended or adjusted under 35 U.S.C. 154(b) by 19 days.

(21) Appl. No.: 16/621,511

(22) PCT Filed: Jun. 13, 2017

(86) PCT No.: PCT/CN2017/088080
§ 371 (c)(1),
(2) Date: Dec. 11, 2019

(87) PCT Pub. No.: WO2018/227385
PCT Pub. Date: Dec. 20, 2018

(65) Prior Publication Data
US 2020/0099465 A1    Mar. 26, 2020

(51) Int. Cl.
*H04L 1/00* (2006.01)
*H04W 76/27* (2018.01)
(Continued)

(52) U.S. Cl.
CPC ......... *H04L 1/0004* (2013.01); *H04B 7/0619* (2013.01); *H04L 5/0051* (2013.01);
(Continued)

(58) Field of Classification Search
CPC ....... H04L 1/0004; H04L 5/0051; H04L 5/10; H04W 76/27; H04W 72/042; H04B 7/0619; H04B 7/06
See application file for complete search history.

(56) References Cited

U.S. PATENT DOCUMENTS

2013/0155921 A1* 6/2013 Gomadam .......... H04L 25/0226
                                                                   370/310
2018/0123834 A1* 5/2018 Kim ..................... H04L 27/227
(Continued)

FOREIGN PATENT DOCUMENTS

CN      103746779 A     4/2014
CN      104767592 A     7/2015
(Continued)

OTHER PUBLICATIONS

International Search Report for PCT/CN2017/088080 dated Feb. 28, 2018 [PCT/ISA/210].
(Continued)

*Primary Examiner* — Omar J Ghowrwal
(74) *Attorney, Agent, or Firm* — Sughrue Mion, PLLC

(57) ABSTRACT

A terminal includes a processor configured to: receive, from a network device, an indication indicating the maximum number of codeword(s); receive, from the network device, a Downlink Control Information (DCI) indicating only one set of Modulation and Coding Scheme (MCS), New Data Indication (NDI), and Redundancy Version (RV) if the indication indicating the maximum number of codeword(s) is 1; determine a configuration of MCS, NDI, and RV for downlink transmission based on the DCI; and determine a bit number of the DCI for an index value associated with a configuration of DeModulation Reference Signal (DMRS) based a parameter related with a number of symbols for the DMRS.

22 Claims, 17 Drawing Sheets

(51) Int. Cl.
  *H04L 5/00*    (2006.01)
  *H04L 5/10*    (2006.01)
  *H04W 72/04*   (2009.01)
  *H04B 7/06*    (2006.01)

(52) U.S. Cl.
  CPC ............ *H04L 5/10* (2013.01); *H04W 72/042* (2013.01); *H04W 76/27* (2018.02)

(56) References Cited

U.S. PATENT DOCUMENTS

2018/0234226 A1* 8/2018 Hosseini ............... H04L 1/1893
2019/0223209 A1* 7/2019 Li ........................... H04L 5/00

FOREIGN PATENT DOCUMENTS

| CN | 106656292 A | 5/2017 |
| WO | 2016/159621 A1 | 10/2016 |
| WO | 2016/181331 A1 | 11/2016 |

OTHER PUBLICATIONS

Written Opinion for PCT/CN2017/088080 dated Feb. 28, 2018 [PCT/ISA/237].

Communication dated Jun. 1, 2021, issued by the Japanese Patent Office in application No. 2019-568756.

Intel Corporation, "Remaining details on CW-to-MIMO layer mapping", 3GPP TSG RAN WG1 Meeting #89, Hangzhou, P.R. China, May 15-19, 2017, R1-1707347, 3 pages.

AT&T, "Benefits of Multi Codeword MIMO Schemes in NR", 3GPP TSG RAN WG1 Meeting #88, Athens, Greece, Feb. 13-17, 2017, R1-1702261, 12 pages.

Samsung, "Codeword-to-layer mapping for DL and UL NR MIMO", 3GPP TSG RAN WG1 88, Athens, Greece, Feb. 13-17, 2017, R1-1702915, 6 pages.

Spreadtrum Communications, "Considerations on DMRS for CP-OFDM", 3GPP TSG RAN WG1 meeting #89, Hangzhou, China, May 15-19, 2017, R1-1707784, 6 pages.

* cited by examiner

510

| ONE CODEWORD AND/OR TRANSPORT BLOCK | |
|---|---|
| INDEX VALUE | MESSAGE |
| 0 | 1 layer, port A |
| 1 | 1 layer, port B |
| 2 | 1 layer, port C |
| 3 | 1 layer, port D |
| 4 | 2 layers, ports A, B |
| 5 | 2 layers, ports C, D |
| 6 | 3 layers, ports A, B, C |
| 7 | 4 layers, ports A, B, C, D |

| ONE CODEWORD AND/OR TRANSPORT BLOCK ||
|---|---|
| INDEX VALUE | MESSAGE |
| 0 | 1 layer, port A |
| 1 | 1 layer, port B |
| 2 | 1 layer, port C |
| 3 | 1 layer, port D |
| 4 | 1 layer, port E |
| 5 | 1 layer, port F |
| 6 | 1 layer, port G |
| 7 | 1 layer, port H |
| 8 | 2 layers, ports A, B |
| 9 | 2 layers, ports C, D |
| 10 | 2 layers, ports E, F |
| 11 | 2 layers, ports G, H |
| 12 | 3 layers, ports A, B, C |
| 13 | 3 layers, ports E, F, G |
| 14 | 4 layers, ports A, B, C, D |
| 15 | 4 layers, ports E, F, G, H |

530

| TWO CODEWORDS AND/OR TRANSPORT BLOCKS ||
|---|---|
| INDEX VALUE | MESSAGE |
| 0 | 5 layers, ports A, B, C, D, E |
| 1 | 6 layers, ports A, B, C, D, E, F |
| 2 | 7 layers, ports A, B, C, D, E, F, G |
| 3 | 8 layers, ports A, B, C, D, E, F, G, H |

| ONE CODEWORD AND/OR TRANSPORT BLOCK | |
|---|---|
| INDEX VALUE | MESSAGE |
| 0 | 1 layer, port A |
| 1 | 1 layer, port B |
| 2 | 1 layer, port C |
| 3 | 1 layer, port D |
| 4 | 1 layer, port E |
| 5 | 1 layer, port F |
| 6 | 1 layer, port G |
| 7 | 1 layer, port H |
| 8 | 2 layers, ports A, B |
| 9 | 2 layers, ports C, D |
| 10 | 2 layers, ports E, F |
| 11 | 2 layers, ports G, H |
| 12 | 3 layers, ports A, B, C |
| 13 | 3 layers, ports D, E, F |
| 14 | 4 layers, ports A, B, C, D |
| 15 | 4 layers, ports E, F, G, H |

611 — row 12
612 — row 13

620 →

| TWO CODEWORDS AND/OR TRANSPORT BLOCKS | |
|---|---|
| INDEX VALUE | MESSAGE |
| 0 | 5 layers, Port A, B, C, D, E |
| 1 | 5 layers, Port F, G, H, I, J |
| 2 | 6 layers, Port A, B, C, D, E, F |
| 3 | 6 layers, Port G, H, I, J, K, L |
| 4 | 7 layers, Port A, B, C, D, E, F, G |
| 5 | 8 layers, Port A, B, C, D, E, F, G, H |
| ... | ... |
| ... | ... |

622 — row 0
621 — row 1

| ONE CODEWORD AND/OR TRANSPORT BLOCK ||
|---|---|
| INDEX VALUE | MESSAGE |
| 0 | 1 layer, port A |
| 1 | 1 layer, port B |
| 2 | 1 layer, port C |
| 3 | 1 layer, port D |
| 4 | 1 layer, port E |
| 5 | 1 layer, port F |
| 6 | 1 layer, port G |
| 7 | 1 layer, port H |
| 8 | 1 layer, port I |
| 9 | 1 layer, port J |
| 10 | 1 layer, port K |
| 11 | 1 layer, port L |
| 12 | 2 layers, ports A, B |
| 13 | 2 layers, ports C, D |
| 14 | 2 layers, ports E, F |
| 15 | 2 layers, ports G, H |
| 16 | 2 layers, ports I, J |
| 17 | 2 layers, ports K, L |
| 18 | 3 layers, ports A, B, C |
| 19 | 3 layers, ports D, E, F |
| 20 | 3 layers, ports G, H, I |
| 21 | 3 layers, ports J, K, L |

711 (row 12), 712 (row 19)

720

| TWO CODEWORDS AND/OR TRANSPORT BLOCKS ||
|---|---|
| INDEX VALUE | MESSAGE |
| 0 | 5 layers, ports A, B, D, E, F |
| 1 | 5 layers, ports G, H, J, K, L |
| 2 | 6 layers, ports A, B, C, D, E, F |
| 3 | 6 layers, ports G, H, I, J, K, L |
| 4 | 7 layers, ports A, B, C, E, F, G, H |
| 5 | 8 layers, ports A, B, C, D, E, F, G, H |
| ... | ... |

721 (row 0)

| ONE CODEWORD AND/OR TRANSPORT BLOCK | |
|---|---|
| INDEX VALUE | MESSAGE |
| 0 | 1 layer, port A |
| 1 | 1 layer, port B |
| 2 | 1 layer, port C |
| 3 | 1 layer, port D |
| 4 | 1 layer, port E |
| 5 | 1 layer, port F |
| 6 | 1 layer, port G |
| 7 | 1 layer, port H |
| 8 | 2 layers, ports A, B |
| 9 | 2 layers, ports C, D |
| 10 | 2 layers, ports E, F |
| 11 | 2 layers, ports G, H |
| 12 | 3 layers, ports A, B, C |
| 13 | 3 layers, ports E, F, G |
| 14 | 4 layers, ports A, B, C, D |
| 15 | 4 layers, ports E, F, G, H |

830

| TWO CODEWORDS AND/OR TRANSPORT BLOCKS | |
|---|---|
| INDEX VALUE | MESSAGE |
| 0 | 5 layers, ports A, B, C, D, E |
| 1 | 6 layers, ports A, B, C, D, E, F |
| 2 | 7 layers, ports A, B, C, D, E, F, G |
| 3 | 8 layers, ports A, B, C, D, E, F, G, H |

| ONE CODEWORD AND/OR TRANSPORT BLOCK ||
|---|---|
| INDEX VALUE | MESSAGE |
| 0 | 1 layer, port A |
| 1 | 1 layer, port B |
| 2 | 1 layer, port C |
| 3 | 1 layer, port D |
| 4 | 1 layer, port E |
| 5 | 1 layer, port F |
| 6 | 2 layers, ports A, B |
| 7 | 2 layers, ports C, D |
| 8 | 2 layers, ports E, F |
| 9 | 3 layers, ports A, B, C |
| 10 | 3 layers, ports D, E, F |
| 11 | 4 layers, ports A, B, C, D |
| ... | ... |

850

| TWO CODEWORDS AND/OR TRANSPORT BLOCKS ||
|---|---|
| INDEX VALUE | MESSAGE |
| 0 | 5 layers, ports A, B, C, D, E |
| 1 | 6 layers, ports A, B, C, D, E, F |
| ... | ... |

| ONE CODEWORD AND/OR TRANSPORT BLOCK ||
|---|---|
| INDEX VALUE | MESSAGE |
| 0 | 1 layer, port A |
| 1 | 1 layer, port B |
| 2 | 1 layer, port C |
| 3 | 1 layer, port D |
| 4 | 2 layers, ports A, B |
| 5 | 2 layers, ports C, D |
| 6 | 3 layers, ports A, B, C |
| 7 | 4 layers, ports A, B, C, D |

| ONE CODEWORD AND/OR TRANSPORT BLOCK ||
|---|---|
| INDEX VALUE | MESSAGE |
| 0 | 1 layer, port A |
| 1 | 1 layer, port B |
| 2 | 2 layers, ports A, B |
| ... | ... |

880 ⤴

| ONE CODEWORD AND/OR TRANSPORT BLOCK ||
|---|---|
| INDEX VALUE | MESSAGE |
| 0 | 1 layer, port A, density 6 |
| 1 | 1 layer, port B, density 6 |
| 2 | 1 layer, port A, density 3 |
| 3 | 1 layer, port B, density 3 |
| 4 | 1 layer, port A, density 2 |
| 5 | 1 layer, port B, density 2 |
| 6 | 2 layers, ports A, B, density 6 |
| 7 | 2 layers, ports A, B, density 3 |

Fig. 8E

| ONE CODEWORD AND/OR TRANSPORT BLOCK || TWO CODEWORDS AND/OR TRANSPORT BLOCKS ||
|---|---|---|---|
| INDEX VALUE | MESSAGE | INDEX VALUE | MESSAGE |
| 0 | 1 layer, port A | 0 | 5 layers, ports A, B, C, D, E |
| 1 | 1 layer, port B | 1 | 6 layers, ports A, B, C, D, E, F |
| 2 | 1 layer, port C | 2 | 7 layers, ports A, B, C, D, E, F, G |
| 3 | 1 layer, port D | 3 | 8 layers, ports A, B, C, D, E, F, G, H |
| 4 | 2 layers, ports A, B | 4 | ... |
| 5 | 2 layers, ports C, D | 5 | ... |
| 6 | 3 layers, ports A, B, C | 6 | ... |
| 7 | 4 layers, ports A, B, C, D | 7 | ... |

DMRS-Config
    Number of Ports      N
    Port index Config      $(B_1, B_2, B_3, ..., B_{N-1}, B_N)$
    ...

Fig. 9

METHODS AND APPARATUS FOR COMMUNICATION OF A DCI

CROSS REFERENCE TO RELATED APPLICATIONS

This application is a National Stage of International Application No. PCT/CN2017/088080 filed Jun. 13, 2017.

TECHNICAL FIELD

Embodiments of the present disclosure generally relate to the field of telecommunication, and in particular, to methods and apparatuses for reference signal (RS) configuration.

BACKGROUND

With the development of communication technologies, multiple types of services or traffic have been proposed, for example, enhanced mobile broadband (eMBB) generally requiring high data rate, massive machine type communication (mMTC) typically requiring long battery lifetime, and ultra-reliable and low latency communication (URLLC). Meanwhile, multi-antenna schemes, such as beam management, reference signal transmission, and so on, are studied for new radio access.

Conventionally, a network device (for example, an eNB or a gNB) transmits downlink reference signals (RSs) such as Demodulation Reference Signal (DMRS), Channel State Information-Reference Signal (CSI-RS), Sounding Reference Signal (SRS), and the like. A terminal device (for example, a user equipment) in the system may receive the downlink RSs on allocated resources. The terminal device may also transmit uplink RSs to the network device on corresponding allocated resources. For indicating the allocated resources for the RSs, the network device may transmit RS configurations to the terminal device prior to the transmissions of the RSs.

For example, two configuration patterns for DMRS have been designed and agreed in 3GPP specification works, each of which may support up to 8 or 12 orthogonal DMRS ports. This may result in a relatively large overhead for a network device to indicate a DMRS configuration to a terminal device. In this case, an overhead reduction scheme for DMRS configuration needs to be considered. Further, the scheme for DMRS configuration may also need to consider the requirements of multi-user scheduling and retransmission as well as the relationship between codewords (CWs) and RS transmission layers.

SUMMARY

In general, example embodiments of the present disclosure provide methods and apparatuses for RS configuration.

In a first aspect, there is provided a method implemented in a network device. According to the method, a plurality of RS ports to be used for RS transmission are divided into a plurality of groups by the network device. An indication of at least one group of RS ports selected from the plurality of groups is transmitted to a terminal device served by the network device. A RS configuration for the terminal device is determined based on the at least one group of RS ports. Information on the RS configuration is transmitted to the terminal device.

In a second aspect, there is provided a method implemented in a terminal device. According to the method, an indication of at least one group of RS ports is received from a network device serving the terminal device. The at least one group of RS ports are selected from a plurality of groups of RS ports to be used for RS transmission by the network device. Information on a RS configuration for RS transmission is received from the network device. The RS configuration is determined based on the at least one group of RS ports by the network device.

In a third aspect, there is provided a network device. The network device comprises a processor and a memory coupled to the processor. The memory stores instructions that when executed by the processor, cause the network device to performs actions. The actions comprise: dividing a plurality of reference signal (RS) ports to be used for RS transmission into a plurality of groups; transmitting, to a terminal device served by the network device, an indication of at least one group of RS ports selected from the plurality of groups; determining, based on the at least one group of RS ports, a RS configuration for the terminal device; and transmitting, to the terminal device, information on the RS configuration.

In a fourth aspect, there is provided a terminal device. The terminal device comprises a processor and a memory coupled to the processor. The memory stores instructions that when executed by the processor, cause the network device to performs actions. The actions comprise: receiving, from a network device serving the terminal device, an indication of at least one group of reference signal (RS) ports, the at least one group of RS ports being selected from a plurality of groups of RS ports to be used for RS transmission by the network device; and receiving, from the network device, information on a RS configuration for RS transmission, the RS configuration being determined based on the at least one group of RS ports by the network device.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 5A-5B show examples of a plurality of RS configurations determined based on the selected one or more group of RS ports according to some embodiments of the present disclosure;

FIG. 6 shows an example of the requirements of multi-user scheduling and accordant retransmission according to some embodiments of the present disclosure;

FIG. 7 shows examples of RS configurations meeting the requirements of accordant retransmission according to some embodiments of the present disclosure;

FIGS. 8A-8F show examples of RS configurations in different configuration patterns according to some embodiments of the present disclosure;

FIG. 9 shows an example of the indication of selected RS ports according to some embodiments of the present disclosure;

Throughout the drawings, the same or similar reference numerals represent the same or similar element.

DETAILED DESCRIPTION

Figure 1:
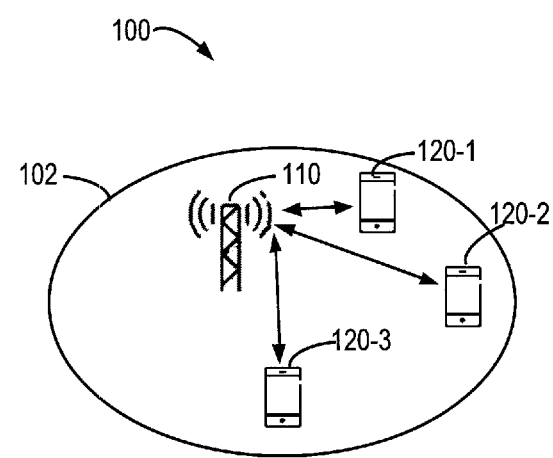
FIG. 1 is a block diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Remote Radio Unit (RRU), a radio head (RH), a remote radio head (RRH), a low power node such as a femto node, a pico node, and the like. For the purpose of discussion, in the following, some embodiments will be described with reference to gNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UE as examples of the terminal device.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "at least in part based on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Communication discussed in the present disclosure may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

FIG. 1 shows an example communication network 100 in which embodiments of the present disclosure can be implemented. The network 100 includes a network device 110 and three terminal devices 120-1 and 120-3 (collectively referred to as terminal devices 120 or individually referred to as terminal device 120) served by the network device 110. The coverage of the network device 110 is also called as a cell 102. It is to be understood that the number of base stations and terminal devices is only for the purpose of illustration without suggesting any limitations. The network 100 may include any suitable number of base stations and the terminal devices adapted for implementing embodiments of the present disclosure. Although not shown, it would be appreciated that there may be one or more neighboring cells adjacent to the cell 102 where one or more corresponding network devices provides service for a number of terminal device located therein.

The network device 110 may communicate with the terminal devices 120. The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In addition to normal data communications, the network device 110 may send a RS in a broadcast, multi-cast, and/or unicast manners to one or more of the terminal devices 120 in a downlink. Similarly, one or more of the terminal devices 120 may transmit RSs to the network device 110 in an uplink. As used herein, a "downlink" refers to a link from a network device to a terminal device, while an "uplink" refers to a link from the terminal device to the network device. For the purpose of discussion without suggesting any limitations, in the following description, some embodiments will be described with reference to the downlink RS transmission.

For example, in the case of downlink RS transmission, the RS may be used by the terminal devices 120 for beam sweeping, channel estimation, demodulation, and other operations for communication. Generally speaking, a RS is a signal sequence (also referred to as "RS sequence") that is known by both the network device 110 and the terminal devices 120. For example, a RS sequence may be generated and transmitted by the network device 110 based on a certain rule and the terminal device 120 may deduce the RS sequence based on the same rule. Examples of the RS may include but are not limited to downlink or uplink Demodulation Reference Signal (DMRS), Channel State Information-Reference Signal (CSI-RS), Sounding Reference Signal (SRS), Phase Tracking Reference Signal (PTRS) and so on. For the purpose of discussion without suggesting any limitations, in the following description, some embodiments will be described with reference to DMRS as examples of the RS.

In transmission of downlink and uplink RSs, the network device 110 may allocate corresponding resources (also referred to as "RS resources") for the transmission and/or specify which RS sequence is to be transmitted. In some scenarios, both the network device 110 and the terminal device 120 are equipped with multiple antenna ports (or antenna elements) and can transmit specified RS sequences with the antenna ports (antenna elements). A set of RS resources associated with a number of RS ports are also specified. A RS port may be referred to as a specific mapping of part or all of a RS sequence to one or more resource elements (REs) of a resource region allocated for RS transmission in time, frequency, and/or code domains. Such resource allocation information may be included in Downlink Control Information (DCI) and indicated to the terminal device 120 via Physical Downlink Control Channel (PDCCH).

As described above, two configuration patterns for DMRS have been designed and agreed in 3GPP specification works, each of which may support up to 8 or 12 orthogonal DMRS ports. However, in a current solution for DMRS configuration in LTE, only a fixed number of bits in DCI are supported for indicating the DMRS configuration, without considering the number of CWs and the relationship between CWs and transmission layers. For example, for downlink-related DCI in LTE, no matter of one or two CWs, fixed 16 bits are reserved for indicating two sets of Modulation and Coding Scheme/New Data Indicator/Redundancy version (MCS/NDURV), and fixed 3 or 4 bits are reserved for indicating antenna port(s), scrambling identity and number of layers. For uplink-related DCI in LTE, no matters of one or two CWs, fixed 12 bits are reserved for indicating MCS/NDURV and precoding information. In this case, due to the increasing number of DMRS ports to be supported, the current solution may result in a relatively large overhead for a network device to indicate the DMRS configuration to a terminal device.

In order to solve the problems above and one or more of other potential problems, a solution for DMRS configuration is provided in accordance with example embodiments of the present disclosure. With the solution, the payload size of Downlink Control Information for indicating the DMRS configuration can be reduced. In addition, flexible multi-user scheduling and accordant retransmission with same layers for one CW can be achieved.

Figure 2A:
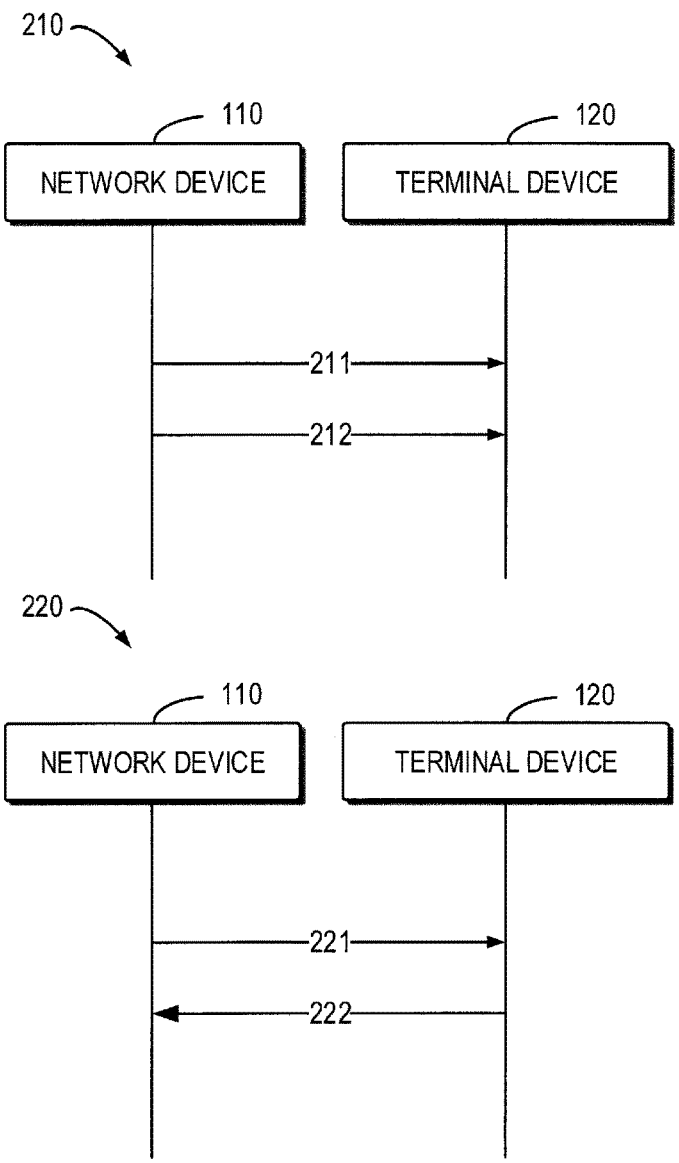
FIG. 2A shows processes for RS transmission according to some embodiments of the present disclosure.

Principle and implementations of the present disclosure will be described in detail below with reference to FIGS. 2-14, in which FIG. 2A shows two processes 210 and 220 for RS transmission according to some embodiments of the present disclosure. For the purpose of discussion, the processes 210 and 220 will be described with reference to FIG. 1. The processes 210 and 220 may involve the network device 110 and one or more terminal devices 120 served by the network device 110.

As shown in FIG. 2A, the process 210 is directed to the case of downlink RS transmission. In one embodiment, the network device 110 may indicate (211) a RS configuration to a terminal device 120. The network device 120 may transmit (212) a RS based on the RS configuration. The terminal device 120 may receive the RS configuration from the network device 110, and detect the RS based on the received RS configuration. In one embodiment, the RS configuration may include at least one of the following: a RS pattern, RS port index(es), the number of symbols for RS, the number of CWs and/or transport blocks, the number of transmission layers, the number of RS ports, the number of PDCCHs, the number of PDSCHs, the maximum number of CWs and/or transport blocks, the maximum number of transmission layers, the maximum number of RS ports, the maximum number of PDCCHs, the maximum number of PDSCHs and so on. In another embodiment, the RS configuration may depend on a report from the terminal device 120. For example, the report may indicate the capability of the terminal device 120 about at least one of the following: the number of RS ports, the number of transmission layers, the number of CWs and/or transport blocks, the number of PDCCHs, the number of PDSCHs and so on.

As shown in FIG. 2A, the process 220 is directed to the case of uplink RS transmission. In another embodiment, the network device 110 may indicate (221) a RS configuration to the terminal device 120. The terminal device 120 may receive from the network device 110 the RS configuration, and may transmit (222) the RS based on the received RS configuration. The network device 110 may detect the RS based on the RS configuration. In one embodiment, the RS configuration may include at least one of the following: a RS pattern, RS port index(es), the number of symbols for RS, the number of CWs and/or transport blocks, the number of transmission layers, the number of RS ports, the number of PDCCHs, the number of PDSCHs, the maximum number of CWs and/or transport blocks, the maximum number of transmission layers, the maximum number of RS ports, the maximum number of PDCCHs, the maximum number of PDSCHs and so on. In another embodiment, the RS configuration may depend on a report from the terminal device 120. For example, the report may indicate the capability of the terminal device 120 about at least one of the following: the number of RS ports, the number of transmission layers, the number of CWs and/or transport blocks, the number of PDCCHs, the number of PDSCHs and so on.

In one embodiment, a set of RS configurations may be determined for RS transmission. One or more RS configurations may be selected from the set of RS configurations and configured for a terminal device 120 by the network device 110. In one embodiment, the terminal device 120 may detect or transmit the RS based on the configured one or more RS configurations.

In one embodiment, a set of RS ports may be used for RS transmission. For example, the set of RS ports may be represented by $(A_1, A_2, A_3, A_4, \ldots, A_{M-1}, A_M)$, where M is an integer and $M \geq 1$, and $A_i$ ($i \in (1, 2, \ldots M)$) represents an index of a RS port. In one embodiment, one or more ports may be selected from the set of RS ports and configured for a terminal device 120. In one embodiment, for example, $K_1$ RS ports (where $K_1$ is an integer and $1 \leq K_1 \leq M$) may be selected from the set of RS ports and configured for the terminal device 120-1. In another embodiment, $K_2$ RS ports (where $K_2$ is an integer and $1 \leq K_2 \leq M$) may be selected from the set of RS ports and configured for the terminal device 120-2. In one embodiment, the number of RS ports configured for one terminal device may be different from that for another terminal device. That is, the value of $K_1$ may be different from that of $K_2$. In one embodiment, the port indices configured for one terminal device may be different from those configured for another terminal device. That is, the port indices of the $K_1$ ports for the terminal device 120-1 may be different from those of the $K_2$ ports for the terminal device 120-2. In another embodiment, the $K_1$ ports for the terminal device 120-1 and the $K_2$ ports for the terminal device 120-2 may be at least partially overlapped or separated from each other. In another embodiment, the port indices of the RS ports selected from the set of RS ports may be contiguous or discontinuous.

Figure 2B:
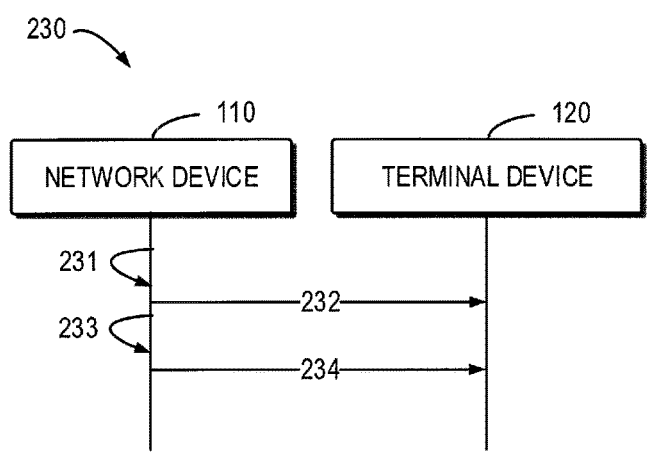
FIG. 2B shows a process for RS configuration according to some embodiments of the present disclosure.

FIG. 2B shows a process 230 for RS configuration according to some embodiments of the present disclosure. For the purpose of discussion, the process 230 will be described with reference to FIG. 1. The process 230 may involve the network device 110 and one or more terminal devices 120 served by the network device 110.

The network device 110 divides (231) a plurality of RS configurations, for example RS ports to be used for RS transmission into a plurality of groups. In one embodiment, at least one group of the plurality of RS configurations will be configured for a terminal device 120.

As described above, given a configuration pattern for DMRS (such as, either of the two configuration patterns for DMRS as agreed in RAN1#89), up to 8 or 12 orthogonal DMRS ports may be supported. In some embodiments, these DMRS ports may be divided into a plurality of groups, each of which may be identified by a corresponding group parameter (for example, an index or identifier).

Figures 3A, 3B:
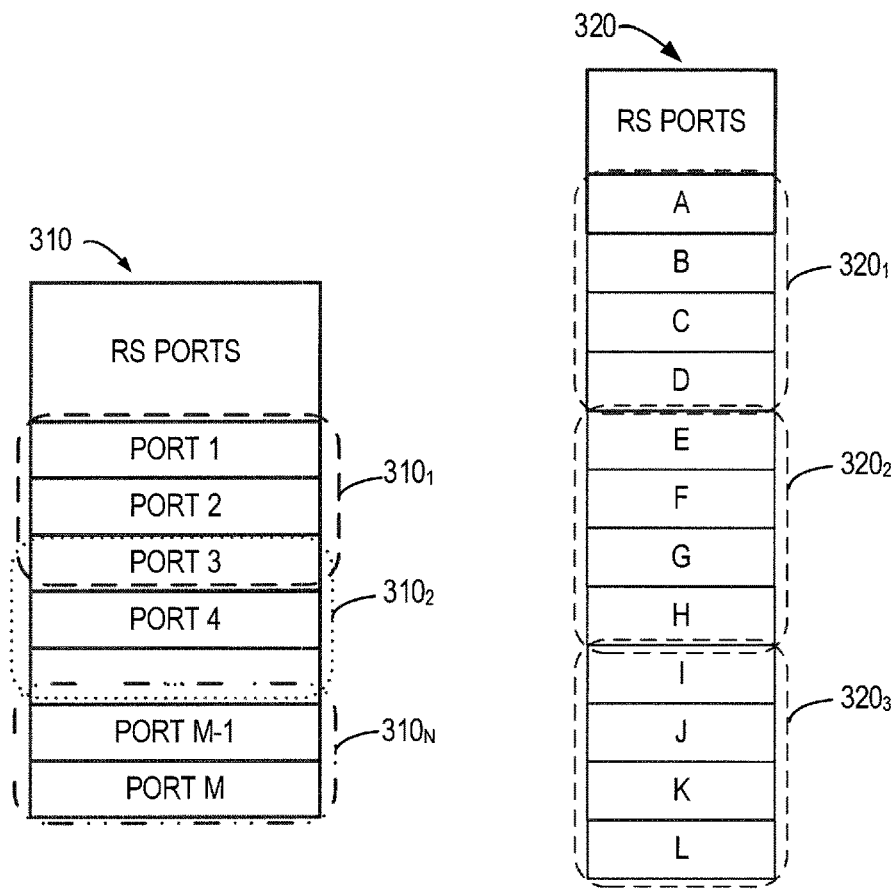
FIG. 3A-3C show examples of the dividing of a plurality of RS ports according to some embodiments of the present disclosure.

FIG. 3A shows an example of a set of RS ports according to an embodiment of the present disclosure. As shown in FIG. 3A, it is supposed that there are totally MRS ports 310 (port 1 through port M), where M is an integer and M>=1. For example, M may equal to 2, 4, 6, 8 or 12 in different scenarios.

In one embodiment, K (where K is an integer, and $1 \leq K \leq M$) RS ports may be selected from the MRS ports 310 and may be configured for a UE (such as, one terminal device 120). In one embodiment, the K RS ports configured for a UE may be UE-specific and/or dedicated to the UE. That is, the value of K and/or the indices of the K RS ports for one UE may be same as, different from or partially overlapped with that for another UE. In another embodiment, the K RS ports configured for a UE may be cell-specific, TRP-specific, and/or beam-specific. That is, the value of K and/or the indices of the K RS ports for one terminal device may be same as that for another UE being served by a same cell, TRP and/or beam. In some embodiments, the K RS ports may be continuously selected from the M RS ports, and thus the indices of the K RS ports may be continuous. In some other embodiments, the K RS ports may be discontinuously selected from the M RS ports, and thus the indices of the K RS ports may be discontinuous.

In one embodiment, the MRS ports may be used for RS transmission. The MRS ports may be multiplexed in different manners. For example, the M RS ports may be multiplexed based on at least one of the following: Comb, cyclic shift (CS), Time Division-Orthogonal Covering Code(TD-OCC), Frequency Division-Orthogonal Covering Code (FD-OCC), Time Division Multiple (TDM) technology, Frequency Division Multiple (FDM) technology and so on.

In some embodiments, the M RS ports may be associated with a first number of multiplexing domains, and the K RS ports selected from the MRS ports may be associated with a second number of multiplexing domains. For example, the first number of multiplexing domains for the K RS ports may be less than the second number of multiplexing domains for the M RS ports. In one embodiment, the M RS ports may be multiplexed based on 2 Combs, 2 CS and 2 TD-OCC ({1, 1} and {1,−1}). In one embodiment, the K RS ports for one terminal device may be multiplexed based on 2 Combs and 2 CS. For example, different groups of RS ports for different terminal devices may be multiplexed based on 2 TD-OCC. In another embodiment, the K RS ports for one terminal device may be multiplexed based on 2 CS and 2 TD-OCC. For example, different groups of RS ports for different terminal devices may be multiplexed based on 2 Combs. In one embodiment, the K RS ports for one terminal device may be multiplexed based on 2 Combs and 2 TD-OCC. For example, different groups of RS ports for different terminal devices may be multiplexed based on 2 CS.

In one embodiment, the MRS ports may be multiplexed based on FDM, FD-OCC, TDM or TD-OCC. In one embodiment, the K RS ports for one terminal device may be multiplexed based on FDM and FD-OCC. For example, different groups of RS ports for different terminal devices may be multiplexed based on TDM or TD-OCC. In one embodiment, the K RS ports for one terminal device may be multiplexed based on FDM and TDM or TD-OCC. For example, different groups of RS ports for different terminal devices may be multiplexed based on FD-OCC. In another embodiment, the K RS ports for one terminal device may be multiplexed based on FD-OCC and TDM or TD-OCC. For example, different groups of RS ports for different terminal devices may be multiplexed based on FDM.

In another embodiment, as shown in FIG. 3A, these M RS ports 310 may be divided into N groups (group 310₁ through group 310_N) each including at least one of the M RS ports. For example, the size of each group may be same or different. In some embodiments, the RS ports included in one group may be the same as that included in another group. That is, some of the groups may be partially overlapped with each other. In other embodiments, some of the groups may not be overlapped. In some embodiments, the RS ports included in one group may be continuously selected from the plurality of RS ports. In other embodiments, the RS ports included in one group may be discontinuously selected from the plurality of RS ports. In one embodiment, one or more groups will be configured for a terminal device 120. For example, group 310₁ may be configured for the terminal device 120-1, group 310₂ may be configured for the terminal device 120-2, and group 310₃ may be configured for the terminal device 120-3.

FIG. 3B shows another example of the dividing of a plurality of RS ports according to an embodiment of the present disclosure. As shown in FIG. 3B, totally 12 RS ports 320 are supported, which are indexed by uppercase letters A-L respectively. The 12 RS ports 320 are divided into 3 groups (group 320₁ through group 320₃), which are not overlapped with each other and each contain 4 RS ports. For example, as shown in FIG. 3B, group 320₁ may include RS ports A, B, C and D, and thus can be represented by (A, B, C, D). Group 320₂ may include RS ports E, F, G and H, and thus can be represented by (E, F, G, H). Similarly, group $320_3$ may be represented by (I, J, K, L).

Figure 3C:
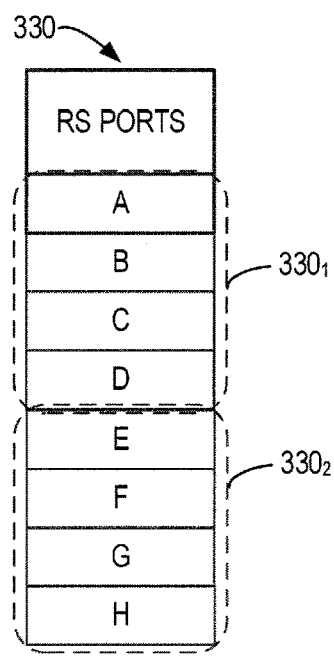

FIG. 3C shows another example of the dividing of a plurality of RS ports according to an embodiment of the present disclosure. As shown in FIG. 3C, totally 8 RS ports 330 are supported, which are indexed by uppercase letters A-H respectively. The 8 RS ports 330 are divided into 2 groups (groups $330_1$ and $330_2$), which are not overlapped with each other and each contain 4 RS ports.

In some embodiments, the dividing of the plurality of RS ports may be based on the relationship between the RS ports and one or two Orthogonal Frequency Division Multiplexing (OFDM) symbols.

In some embodiments, in the case of Interleaved Frequency Division Multiplexing (IFDM) based configuration pattern with different Comb and/or cyclic shifts (that is, Front-load DMRS Configuration 1 as agreed in RAN1#89), up to 8 ports (for example, ports A, B, C, D, E, F, G and H) may be supported. In one embodiment, the 8 RS ports may be multiplexed based on 2 Combs, 2 CS, and 2 TD-OCC ({1, 1} and {1, −1}). In one embodiment, the 8 RS ports may be divided into 2 groups, which are not overlapped with each other and each contains 4 RS ports. In one embodiment, RS ports in each of 2 groups may be multiplexed based on 2 CS and 2 TD-OCC. That is, different groups of RS ports may be multiplexed based on 2 Combs. In another embodiment, the 8 RS ports may be multiplexed based on 4 Combs and 2 CS. In one embodiment, the 8 RS ports may be divided into 2 groups, which are not overlapped with each other and each contains 4 RS ports. In one embodiment, RS ports in each of the 2 groups may be multiplexed based on 4 Combs. That is, different groups of RS ports may be multiplexed based on 2 CS. In another embodiment, RS ports in each of the 2 groups may be multiplexed based on 2 Combs and 2 CS. That is, different groups of RS ports may be multiplexed based on 2 Combs. In another embodiment, the 8 RS ports may be multiplexed based on 2 Combs and 4 CS. In one embodiment, the 8 RS ports may be divided into 2 groups, which are not overlapped with each other and each contains 4 RS ports. In one embodiment, RS ports in each of the 2 groups may be multiplexed based on 4 CS. That is, different groups of RS ports may be multiplexed based on 2 Combs. In another embodiment, RS ports in each of the 2 groups may be multiplexed based on 2 Combs and 2 CS. That is, different groups of RS ports may be multiplexed based on 2 CS.

Figure 4A:
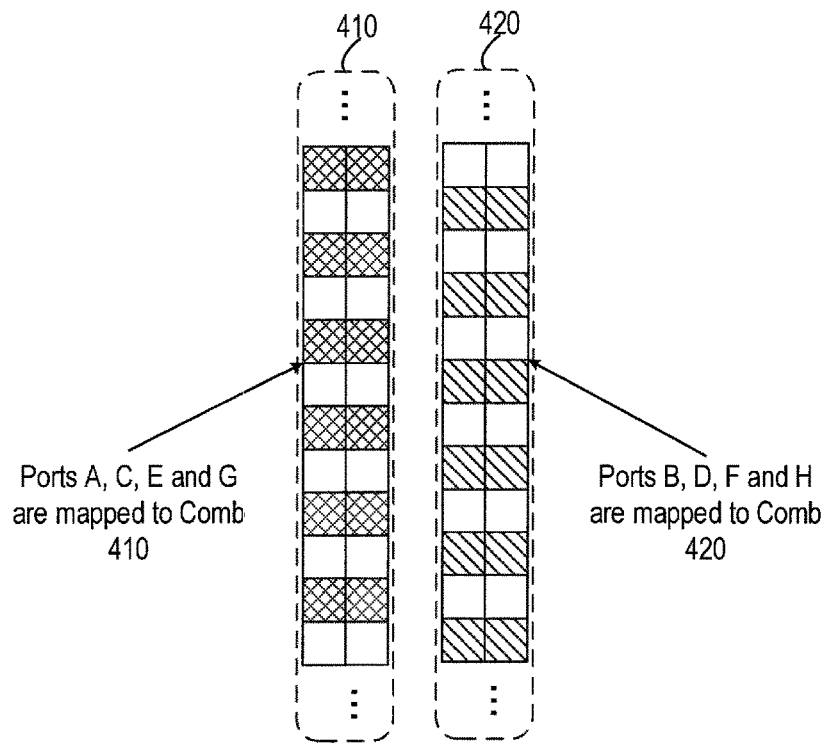
FIG. 4A-4D show examples of different configuration patterns according to some embodiments of the present disclosure.

FIG. 4A shows another example of Front-load DMRS Configuration 1 as agreed in RAN1#89. As shown in FIG. 4A, totally 8 RS ports A-H are mapped to two Orthogonal Frequency Division Multiplexing (OFDM) symbols. For example, RS ports A, C, E and G are mapped to Comb 410, while RS ports B, D, F and H are mapped to Comb 420. In one embodiment, in the example of FIG. 4A, for example, the 8 RS ports A-H may be divided into 2 groups, which are not overlapped with each other and each contain 4 RS ports. In one embodiment, RS ports in each of the 2 groups may be selected from the RS ports mapped to a same Comb. For example, the divided 2 groups may be: (A, C, E, G) and (B, D, F, H). In another embodiment, RS ports in each of the 2 groups may be selected from the RS ports mapped to different Combs. For example, the divided 2 groups may be: (A, B, C, D) and (E, F, G, H). In one embodiment, RS ports A, C, E and G may be multiplexed based on 4 CS, and RS ports B, D, F and H may be multiplexed based on 4 CS. In another embodiment, RS ports A and C may be multiplexed based on 2 TD-OCC and 2 CS, and RS ports B, D, F and H may be multiplexed based on 2 TD-OCC and 2 CS.

Figure 4B:
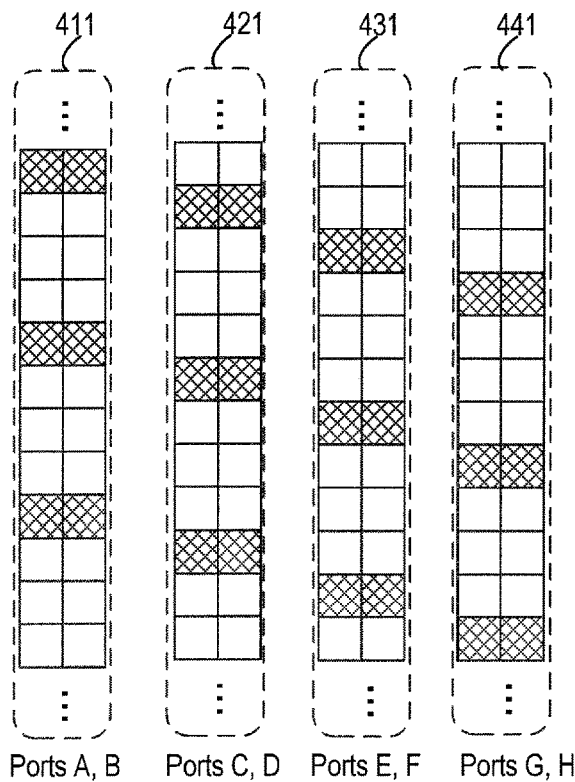

FIG. 4B shows an example of Front-load DMRS Configuration 1 as agreed in RAN1#89. As shown in FIG. 4B, totally 8 RS ports A-H are mapped to two OFDM symbols. For example, RS ports A and B are mapped to Comb 411, RS ports C and D are mapped to Comb 421, RS ports E and F are mapped to Comb 431, RS ports G and H are mapped to Comb 441. In one embodiment, as shown in FIG. 4B, the 8 RS ports A-H may be divided into 2 groups, which are not overlapped with each other and each contain 4 RS ports. In one embodiment, RS ports in each of the 2 groups may be selected from the RS ports mapped to 4 Combs. For example, the divided 2 groups may be: (A, C, E, G) and (B, D, F, H). In another embodiment, RS ports in each of the 2 groups may be selected from the RS ports mapped to 2 Combs. For example, the divided 2 groups may be: (A, B, C, D) and (E, F, G, H).

Figure 4C:
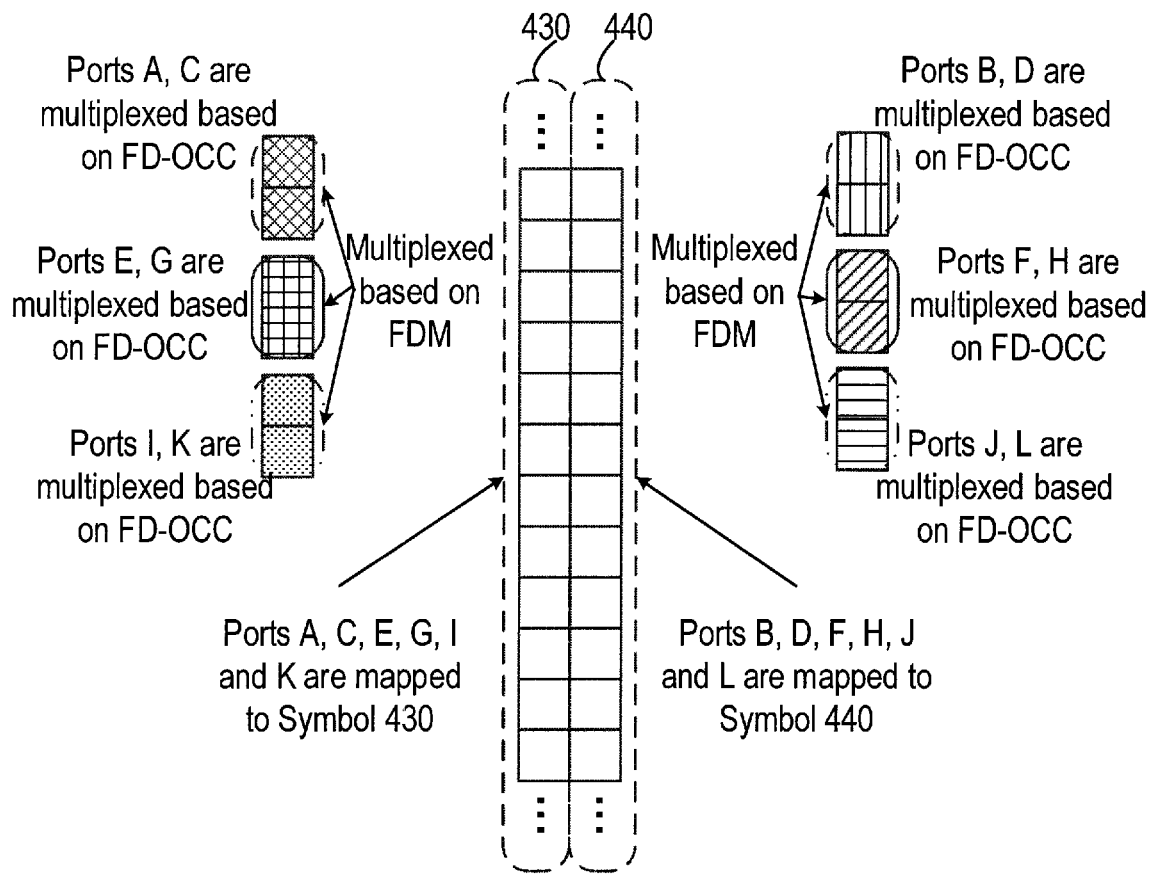

FIG. 4C shows an example of Frequency Division-Orthogonal Covering Code (FD-OCC) based configuration pattern with adjacent REs in the frequency domain (that is, Front-load DMRS Configuration 2 as agreed in RAN1#89). As shown in FIG. 4C, totally 12 RS ports A-L are mapped to two OFDM symbols 430 and 440. For example, RS ports A, C, E, G, I and K are mapped to symbol 430, while RS ports B, D, F, H, J and L are mapped to symbol 440. In one embodiment, RS ports A and C may be multiplexed based on FD-OCC. RS ports A and (E, G, I, K) may be multiplexed based on FDM. RS ports A and (B, D, F, H, J, L) may be multiplexed based on TDM. In one embodiment, specifically, RS ports A, E, I, B, F and J are associated with one same Orthogonal Covering Code (OCC), for example, {1, 1}. RS ports C, G, K, D, H and L are associated with another OCC, for example, {1, −1}. Namely, RS ports A, E, I, B, F and J belong to one OCC group, while RS ports C, G, K, D, H and L belong to another OCC group. In one embodiment, in the example of FIG. 4C, for example, the 12 RS ports A-H may be divided into 3 groups, which are not overlapped with each other and each contain 4 RS ports. In one embodiment, RS ports in each of the 3 groups may be preferably selected from the RS ports mapped to a same symbol. For example, two of the divided 3 groups may be: (A, C, E, G), and (B, D, F, H), while the rest one group may be (I, K, J, L). In another embodiment, RS ports in each of the 3 groups may be preferably selected from the RS ports mapped to different symbols. For example, the divided 3 groups may be: (A, B, C, D), (E, F, G, H) and (I, K, J, L). In yet another embodiment, RS ports in each of the 3 groups may be preferably selected from the RS ports which are mapped to different symbols and belong to a same OCC group. For example, two of the divided 3 groups may be: (A, B, E, F) and (C, G, D, H), while the rest one group may be (I, K, J, L). Alternatively, for example, two of the divided 3 groups may be: (A, E, I, B) and (C, G, K, D), while the rest one group may be (F, H, J, L). In another embodiment, the 12 RS ports A-H may be divided into 2 groups, which are not overlapped with each other and each contain 6 RS ports. In one embodiment, RS ports in each of the 2 groups may be preferably selected from the RS ports mapped to a same symbol. For example, the divided 2 groups may be: (A, C, E, G, I, K), and (B, D, F, H, J, L). In another embodiment, the RS ports in each of the 2 groups may be preferably selected from the RS ports mapped to a same OCC. For example, the divided 2 groups may be: (A, B, E, F, I, J), and (C, D, G, H, K, L).

Figure 4D:
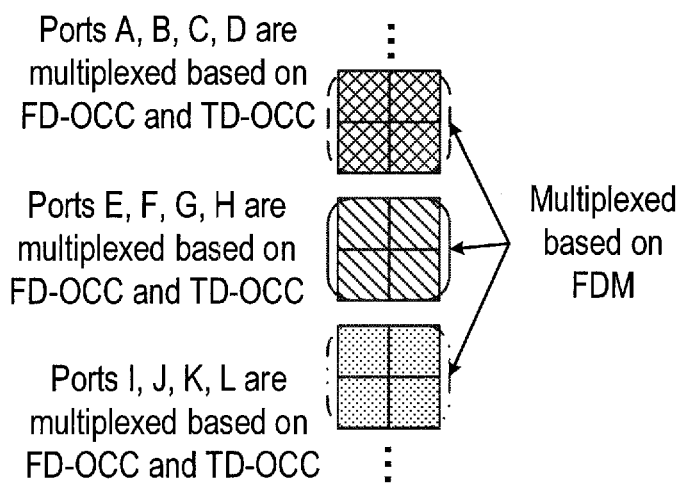

FIG. 4D shows another example of Front-load DMRS Configuration 2 as agreed in RAN1#89. As shown in FIG. 4D, totally 12 RS ports A-L are mapped to two OFDM symbols. In one embodiment, RS ports A, B, C and D may be multiplexed based on FD-OCC and TD-OCC; RS ports E, F, G and H may be multiplexed based on FD-OCC and TD-OCC; and RS ports I, J, K and L may be multiplexed based on FD-OCC and TD-OCC. In addition, different groups of RS ports (that is, (A, B, C, D) and (E, F, G, H) or (I, J, K, L)) may be multiplexed based on FDM.

In one embodiment, the 12 RS ports A-H may be divided into 3 groups, which are not overlapped with each other and each contain 4 RS ports. In one embodiment, RS ports in each of the 3 groups may be preferably selected from the RS ports mapped to a same time and/or frequency resource region. For example, the divided 3 groups may be: (A, B, C, D), (E, F, G, H) and (B, D, F, H). In another embodiment, RS ports in each of the 3 groups may be preferably selected from the RS ports mapped to different time and/or frequency resource region. For example, the divided 3 groups may be: (A, B, E, F), (C, D, K, L) and (G, H, I, J). In another embodiment, the 12 RS ports A-H may be divided into 2 groups, which are not overlapped with each other and each contain 6 RS ports. In one embodiment, the divided 2 groups may be: (A, B, E, F, I, J), and (C, D, G, H, K, L). In another embodiment, the divided 2 groups may be: (A, B, C, D, E, F), and (G, H, I, J, K, L).

Referring back to FIG. 2, the network device 110 transmits (232) an indication of at least one group of RS ports selected from the plurality of groups to the terminal device 120. In one embodiments, the network device 110 may select one or more groups of RS ports from the N groups as shown in FIG. 3A, and then transmit the group parameter(s) associated with the one or more groups of RS ports to the terminal device 120. For example, the network device 110 may transmit the indication of the one or more groups of RS ports to the terminal device 120 via higher layer signaling, such as signaling on Radio Resource Control (RRC) Layer, Medium Access Control (MAC) layer and so on.

In one embodiment, for example, the network device 110 may select only one group (for example, group $320_1$ as shown in FIG. 3B) for the terminal device 120. The network device 110 may transmit the indication of group $320_1$ (for example, the index of group $320_1$) to the terminal device 120 via higher layer signaling. Once the terminal device 120 is indicated with one group which includes 4 RS ports, up to 4 RS transmission layers may be supported for the terminal device 120, which means only one CW can be used for RS transmission.

In another embodiment, for example, the network device 110 may select two groups (for example, groups $320_1$ and $320_2$ as shown in FIG. 3B) for the terminal device 120. The network device 110 may transmit the indication of groups $320_1$ and $320_2$ (for example, the indices of groups $320_1$ and $320_2$) to the terminal device 120 via higher layer signaling. Once the terminal device 120 is indicated with two groups each including 4 RS ports, up to 8 RS transmission layers may be supported for the terminal device 120, which means one or two CWs can be used for RS transmission.

Then, the network device 110 determines (233), based on the selected one or more groups of RS ports, a RS configuration for the terminal device 120, and transmits (234) information on the determined RS configuration to the terminal device 120.

In some embodiments, the network device 110 may determine a plurality of RS configurations for RS transmission based on the selected one or more groups of RS ports. Each of the plurality of RS configurations may be associated with a subset of the selected one or more groups of RS ports. Then, the network device 110 may select, from the plurality of RS configurations, the RS configuration for the terminal device 120.

In one embodiment, for example, if the network device 110 selects only one group (for example, group $320_1$ as shown in FIG. 3B) including 4 RS ports for the terminal device, RS transmission with only one CW can be supported. FIG. 5A shows an example of a plurality of RS configurations determined based on the selected one group of RS ports in this case. As shown in FIG. 5A, table 510 including totally 8 RS configurations about the number of layers and RS port(s) may be determined based on the selected group $320_1$. Each of the 8 RS configurations is associated with an index value. The network device 110 may select a RS configuration from the table 510 for the terminal device 120. In some embodiments, the network device 110 may include the index value associated with the selected RS configuration in DCI to be transmitted to the terminal device 120 via PDCCH. Then, the network device 110 may transmit the DCI to the terminal device 120 for indicating the selected RS configuration. It can be seen that only 3 bits in the DCI are needed for the indication of the selected RS configuration, and thus the overhead for indicating the RS configuration is greatly reduced.

In one embodiment, to reduce the overhead of transmission of the information on the RS configuration, the plurality of RS configurations (such as, the table 510 for up to 4 transmission layers) may have been specified or indicated to the terminal device 120 in advance, and each of the plurality of RS configurations may be identified by an index value. When the network device 110 indicates another group (for example, group $320_2$ as shown in FIG. 3B other than group $320_1$) including the same number of RS ports to the terminal device 120, the RS port indices in the table 510 may be replaced by the RS port indices in the indicated other group respectively. For example, if the network device 110 indicates group $320_2$ as shown in FIG. 3B to the terminal device 120, ports A, B, C and D in the table 510 may be replaced by ports E, F, G and H, respectively. If the network device 110 indicates group $320_3$ as shown in FIG. 3B to the terminal device 120, ports A, B, C and D in the table 510 may be replaced by ports I, J, K and L, respectively.

In another embodiment, for example, if the network device 110 selects two groups (for example, groups $320_1$ and $320_2$ as shown in FIG. 3B) each including 4 RS ports for the terminal device, RS transmission with only one or two CWs can be supported. FIG. 5B shows an example of a plurality of RS configurations determined based on the selected two groups of RS ports in this case. As shown in FIG. 5B, table 520 including totally 16 RS configurations for RS transmission with one CW and table 530 including totally 4 RS configurations for RS transmission with two CWs may be determined based on the selected groups $320_1$ and $320_2$. Each of these RS configurations is associated with an index value. The network device 110 may select a RS configuration from the table 520 or 530 for the terminal device 120. In some embodiments, the network device 110 may include the index value associated with the selected RS configuration in DCI to be transmitted to the terminal device 120 via PDCCH. Then, the network device 110 may transmit the DCI to the terminal device 120 for indicating the selected RS configuration. It is to be understood that, in some embodiments, if the network device 110 selects two different groups other than groups $320_1$ and $320_2$ as shown in FIG. 3B, the RS port indices in the tables 520 and 530 may be replaced by the corresponding RS port indices in the two different groups respectively.

In some embodiments, the determination of the plurality of RS configurations for RS transmission based on the selected one or more groups of RS ports may take into account the requirements of multi-user scheduling and accordant retransmission with same layers for one CW. FIG. 6 shows an example of the requirements of multi-user scheduling and/or accordant retransmission. As shown in FIG. 6, table 610 is defined for RS transmission with one CW, while table 620 is defined for RS transmission with two CWs. Specifically, in the table 620, a RS configuration 621 for RS transmission with two CWs indicates five RS transmission layers and corresponding RS ports F, G, H, I and J. If one of the two CW is transmitted with RS ports F and G and the transmission fails, RS ports F and G cannot be used for retransmission of the failed CW, because no RS configuration indicating two RS transmission layers and RS ports F and G can be found in the table 610. In addition, as shown by RS configurations 611 and 612 in the table 610 as well as RS configurations 621 and 622 in the table 620, the RS ports associated with 3-layer RS transmission are always overlapped with the RS ports associated with 5-layer RS transmission. Therefore, multi-user scheduling with 3-layer RS transmission and 5-layer RS transmission cannot be achieved with the tables 610 and 620 as shown in FIG. 6.

As will be further described in the following, the solution for RS configuration according to the present disclosure can solve the above problems.

In some embodiments, the plurality of RS configurations may be determined to comprise first and second RS configurations for RS transmission with one CW and a third RS configuration for RS transmission with two CWs. The first, second and third RS configurations are respectively associated with first, second and third subsets of the selected one or more groups of RS ports, and the third subset may be composed of the first and second subsets. In this way, a relatively large number of layers configured for RS transmission with two CWs may be able to be split into several relatively small numbers of layers configured for RS transmission with one CW. As such, if the transmission of one of the two CWs fails, the same transmission layers (such as, the RS ports) can be used for retransmission of the failed CW.

FIG. 7 shows examples of RS configurations meeting the requirements of accordant retransmission according to an embodiment of the present disclosure. As shown in FIG. 7, table 710 is defined for RS transmission with one CW, while table 720 is defined for RS transmission with two CWs. Specifically, in the table 720, a RS configuration 721 for RS transmission with two CWs indicates five RS transmission layers and corresponding RS ports A, B, D, E and F. Without loss of generality, one of the two CWs may be transmitted with RS ports A and B, while the other of the two CWs may be transmitted with RS ports D, E and F. If the transmission of either of the two CWs fails, the same transmission layers (such as, the RS ports) can be used for retransmission of the failed CW, because a RS configuration 711 associated with RS ports A and B and a RS configuration 712 associated with RS ports D, E and F can be found in the table 710.

Alternatively, or in addition, in some embodiments, the plurality of RS configurations may be determined to comprise a fourth RS configuration for RS transmission with one CW and a fifth RS configuration for RS transmission with two CWs. The fourth and fifth RS configurations are respectively associated with fourth and fifth subsets of the selected one or more groups of RS ports, and the fourth and fifth subsets are un-overlapped with each other. In this way, multi-user scheduling with the fourth and fifth RS configurations can be achieved.

As shown in FIG. 7, in the table 720, a RS configuration 722 for RS transmission with two CWs indicates eight RS transmission layers and corresponding RS ports A, B, C, D, E, F, G and H. In the table 710, a RS configuration 713 for RS transmission with one CW indicates four RS transmission layers and corresponding RS ports I, J, K and L. With the RS configurations 722 and 713, multi-user scheduling with 8-layer RS transmission and 4-layer RS transmission can be achieved, since the RS ports associated with the RS configuration 722 and the RS ports associated with the RS configuration 713 are not overlapped.

Figure 8A:
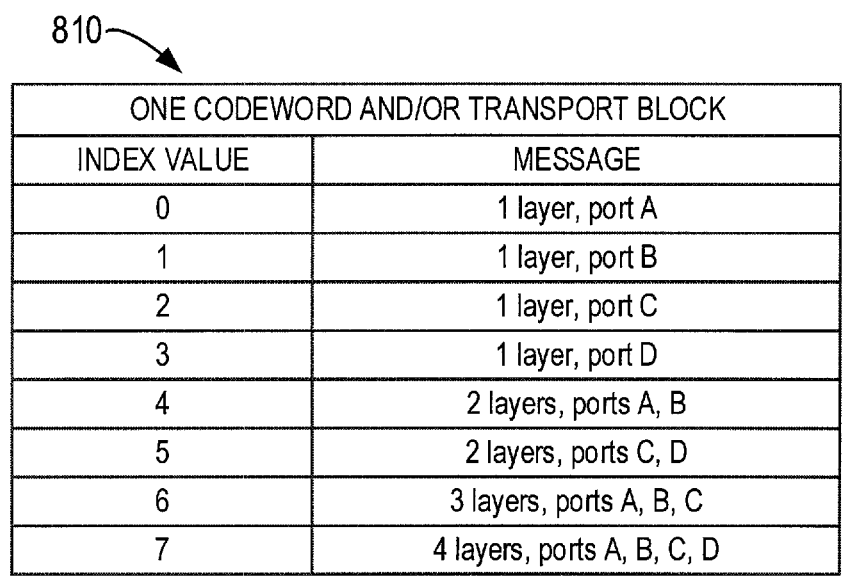

In some embodiments, if the terminal device 120 has already been configured, via higher layer signaling (such as, signaling on RRC layer), with the number of symbols (for example, one or two) to be used for RS transmission, the overhead of transmission of the information on the RS configuration may be further reduced. FIGS. 8A-8E show examples of RS configurations in different configuration patterns according to some embodiments of the present disclosure. FIGS. 8A-8B show examples of RS configurations in the IFDM based configuration pattern with different Comb and/or cyclic shifts (that is, Front-load DMRS Configuration 1 as agreed in RAN1#89). FIGS. 8C-8E show examples of RS configurations in the FD-OCC based configuration pattern with adjacent REs in the frequency domain (that is, Front-load DMRS Configuration 2 as agreed in RAN1#89). Specifically, in examples of FIGS. 8A-8E, the network device 110 and the terminal device 120 are configured to use only one symbol for RS transmission.

As shown in FIG. 8A, up to 4 RS ports are supported in the IFDM based configuration pattern with Comb 2 and 2 cyclic shifts in one symbol. In this case, only one CW is supported for RS transmission, and thus the DCI may contain only one set of MCS/RV/NDI and the field for indicating a DMRS configuration associated with only one CW. Examples of RS configurations are shown in table 810.

As shown in FIG. 8B, up to 8 RS ports are supported in the IFDM based configuration pattern with Comb 4 and 2 cyclic shifts in one symbol. In this case, up to two CWs are supported for RS transmission, and examples of RS configurations are shown in tables 820 and 830, where the table 820 comprises RS configurations associated with one CW and the table 830 comprises RS configurations associated with two CWs.

As shown in FIG. 8C, up to 6 RS ports are supported in the FD-OCC based configuration pattern with 2-FD-OCC across adjacent REs in the frequency domain. In this case, up to two CWs are supported for RS transmission, and examples of RS configurations are shown in tables 840 and 850, where the table 840 comprises RS configurations associated with one CW and the table 850 comprises RS configurations associated with two CWs.

As shown in FIG. 8D, up to 4 RS ports are supported in the FD-OCC based configuration pattern with 2-FD-OCC across adjacent REs in the frequency domain. In this case, only one CW is supported for RS transmission, and thus the DCI may contain only one set of MCS/RV/NDI and the field for indicating a DMRS configuration associated with only one CW. Examples of RS configurations are shown in table 860.

As shown in FIG. 8E, up to 2 RS ports are supported in the FD-OCC based configuration pattern with 2-FD-OCC across adjacent REs in the frequency domain. In this case, only one CW is supported for RS transmission, and thus the DCI may contain only one set of MCS/RV/NDI and the field for indicating a DMRS configuration associated with only one CW. Examples of RS configurations are shown in table 870 or 880.

In one embodiment, a set of RS ports may be used for RS transmission. For example, the set of RS ports may be represented by $(A_1, A_2, A_3, A_4 \ldots, A_{M-1}, A_M)$, where M is an integer and M≥1, and $A_i$ (i ∈(1, 2, ... M)) represents an index of a RS port. In one embodiment, one or more ports selected from the set of RS ports may be configured for a terminal device 120. For example, N RS ports (where N is an integer and 1≤N≤M) may be selected from the set of RS ports and configured for a terminal device 120. The N RS ports may be represented by $(B_1, B_2, B_3, \ldots, B_{N-1}, B_N)$, where N is an integer and N≥1, and $B_j$ (j ∈(1, 2, ... N)) is selected from $A_i$ (i ∈(1, 2, ... M)). In one embodiment, the port indices of the RS ports configured for one terminal device may be different from those configured for another UE. In another embodiment, the port indices of the RS ports configured for different terminal devices may be at least partially overlapped or separated from each other. In another embodiment, the port indices of the RS ports selected from the set of RS ports may be contiguous or discontinuous.

In one embodiment, the N RS ports may be indicated to the terminal device 120 via higher layer signaling, such as signaling on Radio Resource Control (RRC) Layer, Medium Access Control (MAC) layer and so on. In another embodiment, the N RS ports may be indicated to the terminal device 120 via physical layer signaling. For example, the indication of the N RS ports may be included in DCI and transmitted to the terminal device 120 via PDCCH.

In one embodiment, the indices of the N RS ports may have different orders for different terminal devices. In one embodiment, 12 RS ports (for example, ports A, B, C, D, E, F, G, H, I, J, K and L) or 8 RS ports (for example, ports A, B, C, D, E, F, G and H) may be used for RS transmission. In one embodiment, the 8 RS ports (for example, ports A, B, C, D, E, F, G and H) may be configured for one terminal device. For RS transmission with no more than 4 layers, ports A, B, C and/or D may be used. That is, RS ports E, F, G and/or H may be only used for RS transmission with more than 4 layers. In one embodiment, the plurality of RS configurations may have been specified or indicated to the terminal device in advance, and each of the plurality of RS configurations may be identified by an index value. FIG. 8F shows examples of the plurality of RS configurations, where table 890 is shown to include RS configurations for RS transmission with no more than 4 layers, and table 891 is shown to include RS configurations for RS transmission with 5-8 layers. In another embodiment, the 8 RS ports in a different order may be configured for another UE, for example, RS ports E, F, G, H, A, B, C and D. For RS transmission with no more than 4 layers, RS ports E, F, G and/or H may be used. That is, RS ports A, B, C and/or D may be only used for RS transmission with more than 4 layers. In one embodiment, RS configurations in table 890 may be used for RS transmission with no more than 4 layers, while RS configurations in table 891 may be used for RS transmission with 5-8 layers, with ports A, B, C and D in tables 890 and 891 being replaced by ports E, F, G and H respectively, and ports E, F, G and H in tables 890 and 891 being replaced by ports A, B, C and D respectively. In this case, a common configuration table may be used for terminal devices with different ports configurations.

In one embodiment, the value of N may be indicated with a field for indicating the number of RS ports. In another embodiment, there may be a predefined number (for example, L) of RS ports to be used for RS transmission. Therefore, R bits may be used to indicate different number of RS ports, where R=ceil (log 2(L)). In one embodiment, the port indices $(B_1, B_2, B_3, \ldots, B_{N-1}, B_N)$ may be indicated to the terminal device individually. In another embodiment, the port indices may be divided into groups, each of the groups being associated with a group index. For example, one or more group indices may be indicated to the terminal device in this case.

FIG. 9 shows an example of the indication of the N RS ports. In another embodiment, a set of RS ports (for example, RS ports $(A_1, A_2, A_3, A_4 \ldots, A_{M-1}, A_M)$, as described above) may be used for RS transmission. A bitmap with M bits (for example, '11110000 ... 0') may be used for indicating the N RS ports for one terminal device. For example, a bit of '1' in the bitmap may indicate that the corresponding RS port is selected, while a bit of '0' in the bitmap may indicate the corresponding RS port is not selected.

In some embodiments, information on the grouping of RS configurations may depend on different parameters related to RS transmission. In one embodiment, the information on the grouping of RS configurations may comprise at least one of the following: a size of each group, the number of groups, indices of antenna port(s) in each group, and so on. In one embodiment, the information on the grouping of RS configurations may indicate whether the RS configurations are divided into groups or not. That is, in some embodiments, the RS configurations may not be divided into groups, and thus no group index will be indicated to the terminal device in this case.

In some embodiments, the information on the grouping of RS configurations may depend on at least one parameter related to RS transmission. In one embodiment, the parameters related to RS transmission may include at least one of the following: RS pattern, the number of symbols for RS, the number of CWs, the number of transport blocks, the number of transmission layers, the number of RS ports, the number of PDCCHs, the number of PDSCHs, the maximum number of CWs, the maximum number of transport blocks, the maximum number of transmission layers, the maximum number of RS ports, the maximum number of PDCCHs, the maximum number of PDSCHs and so on. In one embodiment, the at least one parameter may be indicated by the network device. In another embodiment, the at least one parameter may depend on the capability of the terminal device.

In one embodiment, if the number of DMRS ports is $M_1$, or the maximum number of CWs and/or transport blocks is $T_1$, or the maximum number of transmission layers is $L_1$, or the maximum number of PDCCHs and/or PDSCHs is $P_1$, the size of each group of DMRS configurations may be $G_1$ and the number of groups of DMRS configurations may be $N_1$. If the number of DMRS ports is $M_2$, or the maximum number of CWs and/or transport blocks is $T_2$, or the maximum number of transmission layers is $L_2$, or the maximum number of PDCCHs and/or PDSCHs is $P_2$, the size of each group of DMRS configurations may be $G_2$ and the number of groups of DMRS configurations may be $N_2$.

In one embodiment, for different parameters, the information on the grouping of RS configurations (that is, at least one of the following: a size of each group, the number of groups, indices of antenna port(s) in each group, and so on) may be different. For example, in case that the value of $M_1$ or $T_1$ or $L_1$ or $P_1$ is less than that of $M_2$ or $T_2$ or $L_2$ or $P_2$, the value of $G_1$ may be less than that of $G_2$ and/or the value of $N_1$ may be less than that of $N_2$. In another embodiment, the RS configurations may not be divided into groups. That is, all of the DMRS ports may be configured for the terminal device. In one embodiment, for Front-load DMRS Configuration 1 as agreed in RAN1#89, up to 8 ports may be supported. For example, the RS configurations may be divided into 2 groups. Each of the 2 groups may include 4 DMRS ports. In another embodiment, for Front-load DMRS Configuration 2 as agreed in RAN1#89, up to 12 ports may be supported. For example, the RS configurations may be divided into 3 groups. Each of the 3 groups may include 4 DMRS ports. Alternatively, for example, the RS configurations may be divided into 2 groups. Each of the 2 groups may include 6 DMRS ports.

In some embodiments, the information on the grouping of RS configurations may depend on the number of symbols to be used for RS transmission. In one embodiment, for example, if one symbol is configured for RS transmission, the size of each group of DMRS configurations may be $G_3$, and the number of groups of DMRS configurations may be $N_3$. In another embodiment, for example, if two symbols are configured for RS transmission, the size of each group of DMRS configurations may be $G_4$, and the number of groups of DMRS configurations may be $N_4$. In one embodiment, the value of $G_3$ may be less than that of $G_4$ and/or the value of $N_3$ may be less than that of $N_4$.

Figure 10:
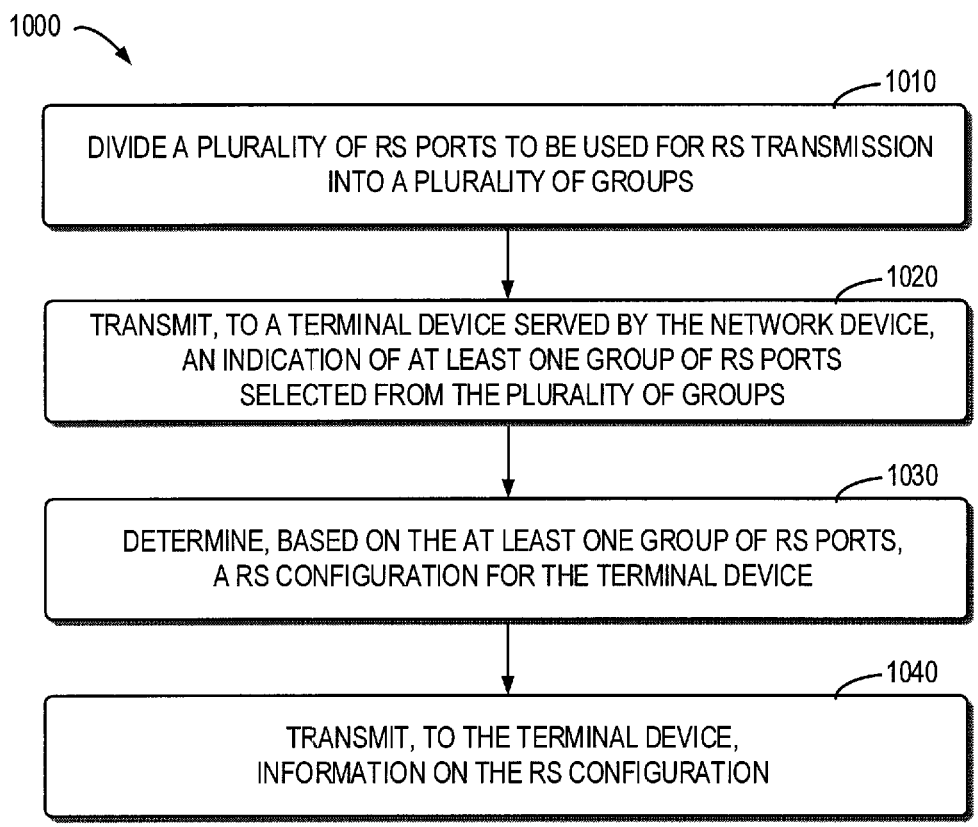
FIG. 10 shows a flowchart of an example method in accordance with some embodiments of the present disclosure.

FIG. 10 shows a flowchart of an example method 900 in accordance with some embodiments of the present disclosure. The method 900 can be implemented at a network device 110 as shown in FIG. 1. For the purpose of discussion, the method 900 will be described from the perspective of the network device 110 with reference to FIG. 1.

In act 1010, the network device 110 divides a plurality of reference signal (RS) ports to be used for RS transmission into a plurality of groups.

In act 1020, the network device 110 transmits, to a terminal device served by the network device, an indication of at least one group of RS ports selected from the plurality of groups.

In some embodiments, transmitting the indication of the at least one group of RS ports comprises: selecting the at least one group of RS ports from the plurality of groups, the at least one group of RS ports being identified by at least one group parameter; and transmitting, to the terminal device, the at least one group parameter for the at least one group of RS ports.

In some embodiments, transmitting the indication of the at least one group of RS ports comprises: transmitting the indication of the at least one group of RS ports to the terminal device via high layer signaling.

In act 1030, the network device 110 determines, based on the at least one group of RS ports, a RS configuration for the terminal device.

In some embodiments, determining the RS configuration for the terminal device comprises: determining, based on the at least one group of RS ports, a plurality of RS configurations for RS transmission, each of the plurality of RS configurations being associated with a subset of the at least one group of RS ports; and selecting, from the plurality of RS configurations, the RS configuration for the terminal device.

In some embodiments, the plurality of RS configurations comprise first and second RS configurations for RS transmission with one CW and a third RS configuration for RS transmission with two CWs, the first, second and third RS configurations being respectively associated with first, second and third subsets of the at least one group of RS ports, and the third subset is composed of the first and second subsets.

In some embodiments, the plurality of RS configurations comprise a fourth RS configuration for RS transmission with one CW and a fifth RS configuration for RS transmission with two CWs, the fourth and fifth RS configurations being respectively associated with fourth and fifth subsets of the at least one group of RS ports, and the fourth and fifth subsets are un-overlapped with each other.

In act 1040, the network device 110 transmits, to the terminal device, information on the RS configuration.

In some embodiments, transmitting to the terminal device the information on the RS configuration comprises: associating the RS configuration with an index value; including the index value in Downlink Control Information (DCI) to be transmitted to the terminal device; and transmitting the DCI to the terminal device.

In some embodiments, the RS includes a demodulation reference signal (DMRS).

Figure 11:
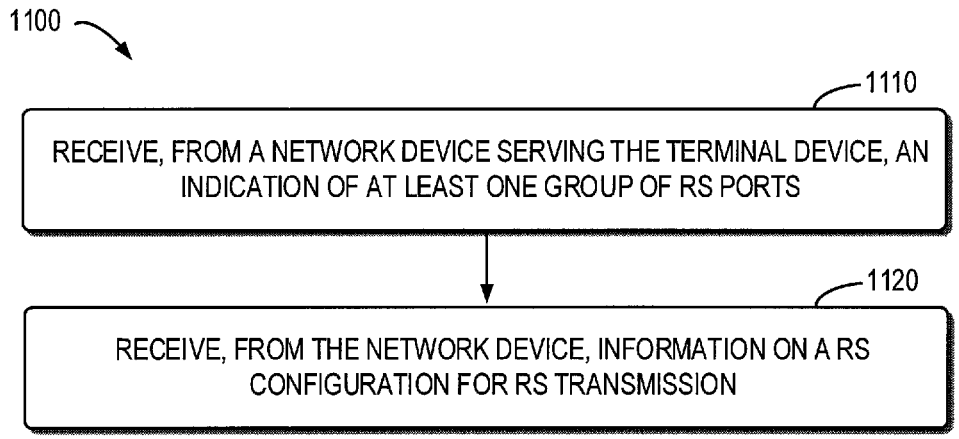
FIG. 11 shows a flowchart of an example method in accordance with some embodiments of the present disclosure.

FIG. 11 shows a flowchart of an example method 1100 in accordance with some embodiments of the present disclosure. The method 1100 can be implemented at a terminal device 120 as shown in FIG. 1. For the purpose of discussion, the method 1100 will be described from the perspective of the terminal device 120 with reference to FIG. 1.

In act 1110, the terminal device 120 receives, from a network device serving the terminal device, an indication of at least one group of reference signal (RS) ports, the at least one group of RS ports being selected from a plurality of groups of RS ports to be used for RS transmission by the network device.

In some embodiments, the at least one group of RS ports is identified by at least one group parameter, and receiving the indication of the at least one group of RS ports comprises: receiving from the network device the at least one group parameter.

In some embodiments, receiving the indication of the at least one group of RS ports comprises: receiving, from the network device, the indication of the at least one group of RS ports via high layer signaling.

In act 1120, the terminal device 120 receives, from the network device, information on a RS configuration for RS transmission, the RS configuration being determined based on the at least one group of RS ports by the network device.

In some embodiments, receiving the information on the RS configuration comprises: receiving, from the network device, Downlink Control Information (DCI) including an index value associated with the RS configuration.

In some embodiments, the RS includes a demodulation reference signal (DMRS).

Figure 12:
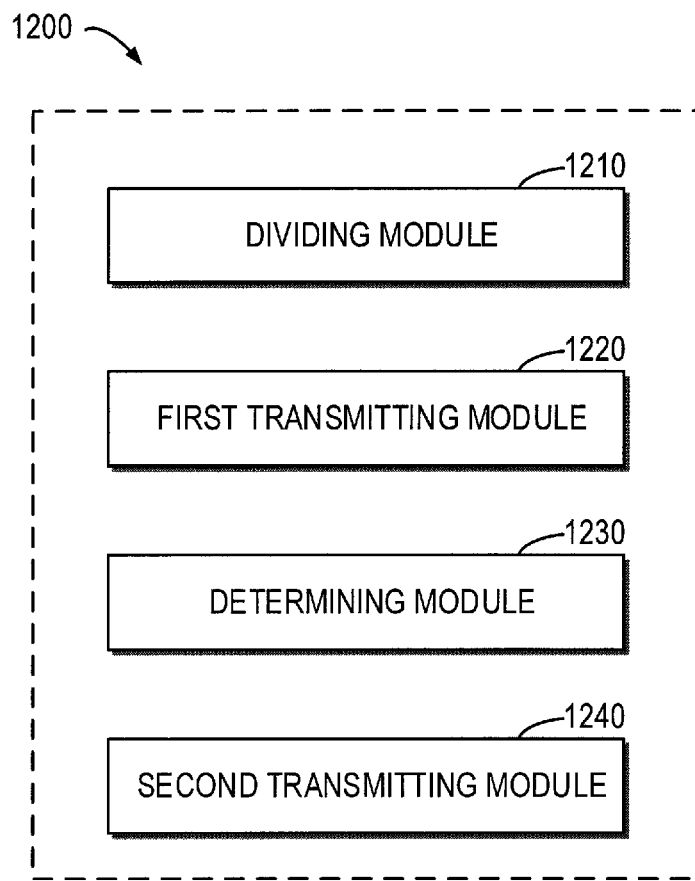
FIG. 12 is a block diagram of a network device in accordance with some embodiments of the present disclosure.

FIG. 12 shows a block diagram of an apparatus 1200 in accordance with some embodiments of the present disclosure. The apparatus 1200 can be considered as an example implementation of the network device 110 as shown in FIG. 1. As shown, the apparatus 1200 includes a dividing module 1210 configured to divide a plurality of reference signal (RS) ports to be used for RS transmission into a plurality of groups. The apparatus 1200 also includes a first transmitting module 1220 configured to transmit, to a terminal device served by the network device, an indication of at least one group of RS ports selected from the plurality of groups. The apparatus 1200 also includes a determining module 1230 configured to determine, based on the at least one group of RS ports, a RS configuration for the terminal device. In addition, the apparatus 1200 also includes a second transmitting module 140 configured to transmit to the terminal device information on the RS configuration.

Figure 13:
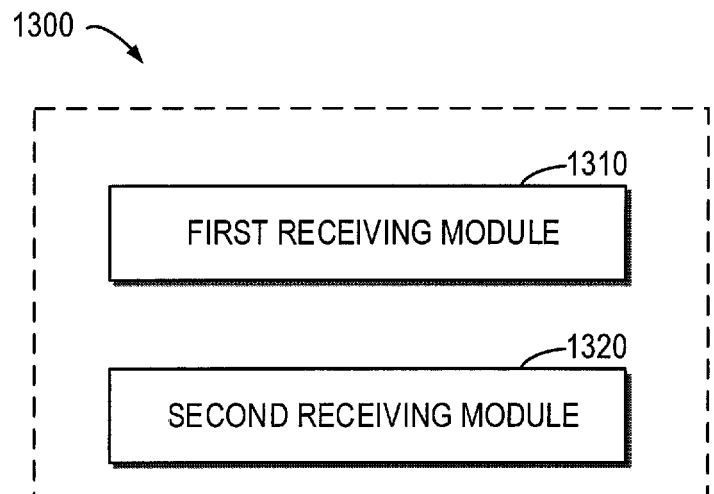
FIG. 13 is a block diagram of a terminal device in accordance with some embodiments of the present disclosure.

FIG. 13 shows a block diagram of an apparatus 1300 in accordance with some embodiments of the present disclosure. The apparatus 1300 can be considered as an example implementation of the terminal device 120 as shown in FIG. 1. As shown, the apparatus 1300 includes a first receiving module 1310 configured to receive, from a network device serving the terminal device, an indication of at least one group of reference signal (RS) ports, the at least one group of RS ports being selected from a plurality of groups of RS ports to be used for RS transmission by the network device. The apparatus 1200 also includes a second receiving module 1320 configured to receive, from the network device, information on a RS configuration for RS transmission, the RS configuration being determined based on the at least one group of RS ports by the network device.

For the sake of clarity, FIGS. 12 and/or 13 do not illustrate some optional modules of the apparatuses 1200 and/or 1300. However, it should be understood that various features as described with reference to FIGS. 1-10 are likewise applicable to the apparatuses 1200 and various features as described with reference to FIGS. 1-9 and 11 are likewise applicable to the apparatuses 1300. Moreover, respective modules of the apparatuses 1200 and/or 1300 may be hardware modules or software modules. For example, in some embodiments, the apparatuses 1200 and/or 1300 may be implemented partially or completely by software and/or firmware, e.g., implemented as a computer program product embodied on the computer-readable medium. Alternatively, or in addition, the apparatuses 1200 and/or 1300 may be partially or completely implemented based on hardware, e.g., implemented as an integrated circuit (IC), an application-specific integrated circuit (ASIC), a system on chip (SOC), a field programmable gate array (FPGA) and the like. The scope of the present disclosure is not limited in this aspect.

Figure 14:
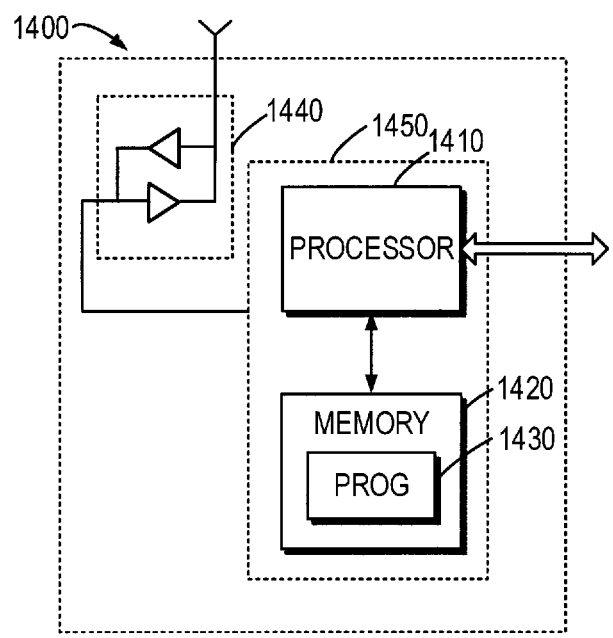
FIG. 14 is a simplified block diagram of a device that is suitable for implementing embodiments of the present disclosure.

FIG. 14 is a simplified block diagram of a device 1400 that is suitable for implementing embodiments of the present disclosure. The device 1400 can be considered as a further example implementation of a network device 110 or a terminal device 120 as shown in FIG. 1. Accordingly, the device 1400 can be implemented at or as at least a part of the network device 110 or the terminal device 120.

As shown, the device 1400 includes a processor 1410, a memory 1420 coupled to the processor 1410, a suitable transmitter (TX) and receiver (RX) 1440 coupled to the processor 1410, and a communication interface coupled to the TX/RX 1440. The memory 1410 stores at least a part of a program 1430. The TX/RX 1440 is for bidirectional communications. The TX/RX 1440 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1430 is assumed to include program instructions that, when executed by the associated processor 1410, enable the device 1400 to operate in accordance with the embodiments of the present disclosure, as discussed herein with reference to FIGS. 1 to 11. The embodiments herein may be implemented by computer software executable by the processor 1410 of the device 1400, or by hardware, or by a combination of software and hardware. The processor 1410 may be configured to implement various embodiments of the present disclosure. Furthermore, a combination of the processor 1410 and memory 1410 may form processing means 1450 adapted to implement various embodiments of the present disclosure.

The memory 1410 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1410 is shown in the device 1400, there may be several physically distinct memory modules in the device 1400. The processor 1410 may be of any type suitable to the local technical network, and may include one or more of general purpose computers, special purpose computers, microprocessors, digital signal processors (DSPs) and processors based on multicore processor architecture, as non-limiting examples. The device 1400 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 1 to 11. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal comprising a processor configured to:
   receive, from a network device, an indication indicating a maximum number of codeword(s);
   receive, from the network device, a Downlink Control Information (DCI) indicating only one set of Modulation and Coding Scheme (MCS), New Data Indication (NDI), and Redundancy Version (RV) based on the indication indicating the maximum number of codeword(s) being 1:
   determine a configuration of MCS, NDI, and RV for downlink transmission based on the DCI; and
   determine a bit number of the DCI for an index value associated with a configuration of DeModudulation Reference Signal (DMRS) based on a parameter related with a number of symbols for the DMRS.

2. The terminal device of claim 1, wherein the processor is further configured to receive the indication via Radio Resource Control (RRC) layer signaling.

3. The terminal device of claim 1, wherein the bit number of the DCI for the configuration of the DMRS with two symbols indicated by the parameter is less than the bit number of the DCI for the configuration of the DMRS with one symbol indicated by the parameter.

4. The terminal device of claim 1, wherein the processor is further configured to:
   receive, from the network device, the indication via Radio Resource Control (RRC) layer signaling; and
   receive, from the network device, the parameter via Radio Resource Control (RRC) layer signaling.

5. The terminal device of claim 1, wherein the configuration of the DMRS is associated with a number of symbols and a number of codeword(s) for the DMRS.

6. The terminal device of claim 1, wherein the processor is further configured to receive the DMRS based on the configuration of the DMRS.

7. A network device comprising a processor configured to:
   transmit, to a terminal device, an indication indicating a maximum number of codeword(s);
   transmit, to the terminal device, a Downlink Control Information (DCI) indicating only one set of Modulation and Coding Scheme (MCS), New Data Indication (NDI), and Redundancy Version (RV) ifbased on the indication indicating the maximum number of codeword(s) being 1; and
   determine a bit number of the DCI for an index value associated with a configuration of DeModul ati on Reference Signal (DMRS) based on a parameter related with a number of symbols for the DMRS.

8. The network device of claim 7, wherein the processor is further configured to transmit the indication via Radio Resource Control (RRC) layer signaling.

9. The network device of claim 7, wherein the hit number of the DCI for the configuration of the DMRS with two symbols indicated by the parameter is less than the bit number of the DCI for the configuration of the DMRS with one symbol indicated by the parameter.

10. The network device of claim 7, wherein the processor is further configured to:
    transmit, to the terminal device, the indication via Radio Resource Control (RRC) layer signaling; and
    transmit, to the terminal device, the parameter via Radio Resource Control (RRC) layer signaling.

11. The network device of claim 7, wherein the configuration of the DMRS is associated with a number of symbols and a number of codeword(s) for the DMRS.

12. The network device of claim 7, wherein the processor is further configured to transmit, to the terminal device, the DMRS.

13. A method comprising:
    receiving, from a network device, an indication indicating a maximum number of codeword(s);
    receiving, from the network device, a Downlink Control Information (DCI) indicating only one set of Modulation and Coding Scheme (MCS), New Data Indication (NDI), and Redundancy Version (RV) based on the indication indicating the maximum number of codeword(s) being 1; determining a configuration of MCS, NDI, and RV for downlink transmission based on the DCI; and
    determining a bit number of the DCI for an index value associated with a configuration of DeModulation Reference Signal (DMRS) based on a parameter related with a number of symbols for the DMRS.

14. The method according to claim 13, wherein the bit number of the DCI for the configuration of the DMRS with two symbols indicated by the parameter is less than the bit number of the DCI for the configuration of the DMRS with one symbol indicated by the parameter.

15. The method according to claim 13, further comprising:

receiving the indication via Radio Resource Control (RRC) layer signaling; and receiving the parameter via Radio Resource Control (RRC) layer signaling.

16. The method according to claim 13, wherein the configuration of the DMRS is associated with a number of symbols and a number of codeword(s) for the MRS.

17. The method according to claim 13, further comprising:

receiving the DMRS based on the configuration of the DMRS.

18. A method comprising:

transmitting, to a terminal device, an indication indicating a maximum number of codeword(s) and;

transmitting, to the terminal device, a Downlink Control Information (DCI) indicating only one set of Modulation and Coding Scheme (MCS), New Data Indication (NDI), and Redundancy Version (RV) based on the indication indicating the maximum number of codeword(s) being 1; and determining a bit number of the DCI for an index value associated with a configuration of DeModulation Reference Signal (DMRS) based on a parameter related with a number of symbols for the DMRS.

19. The method according to claim 18, wherein the bit number of the DCI for the configuration of the DMRS with two symbols indicated by the parameter is less than the bit number of the DCI for the configuration of the DMRS with one symbol indicated by the parameter.

20. The method according to claim 18, further comprising:

transmitting the indication via Radio Resource Control (RRC) layer signaling, and transmitting the parameter via Radio Resource Control (RRC) layer signaling.

21. The method according to claim 18, wherein the configuration of the DMRS is associated with a number of symbols and a number of codeword(s) for the DMRS.

22. The method according to claim 18, further comprising:

transmitting the DMRS.

* * * * *